(12) United States Patent
Zhang et al.

(10) Patent No.: US 12,250,174 B2
(45) Date of Patent: *Mar. 11, 2025

(54) REFERENCE SIGNAL TRANSMISSION METHOD AND TRANSMISSION APPARATUS

(71) Applicant: HUAWEI TECHNOLOGIES CO., LTD., Guangdong (CN)

(72) Inventors: Xi Zhang, Chengdu (CN); Minghui Xu, Shenzhen (CN); Weimin Xiao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,183

(22) Filed: Nov. 8, 2023

(65) Prior Publication Data

US 2024/0080163 A1    Mar. 7, 2024

Related U.S. Application Data

(63) Continuation of application No. 16/716,183, filed on Dec. 16, 2019, now Pat. No. 11,855,922, which is a (Continued)

(30) Foreign Application Priority Data

Jun. 16, 2017    (CN) .......................... 201710458494.1

(51) Int. Cl.
*H04L 5/00* (2006.01)
*H04L 5/10* (2006.01)
(Continued)

(52) U.S. Cl.
CPC .............. *H04L 5/0051* (2013.01); *H04L 5/10* (2013.01); *H04W 72/0453* (2013.01);
(Continued)

(58) Field of Classification Search
CPC ....... H04L 5/0051; H04L 5/10; H04L 5/0048; H04L 25/03006; H04L 5/0053;
(Continued)

(56) References Cited

U.S. PATENT DOCUMENTS

2011/0128976 A1    6/2011    Barry et al.
2012/0329503 A1    12/2012    George et al.
(Continued)

FOREIGN PATENT DOCUMENTS

CN    102215571 A    10/2011
CN    102356603 A    2/2012
(Continued)

OTHER PUBLICATIONS

Huawei et al.,"PTRS for CP-OFDM",3GPP TSG RAN WG1 Meeting #89 R1-1706937,Hangzhou, China, May 15, 19, 2017,total 6 pages.
(Continued)

*Primary Examiner* — Yu-Wen Chang

(57) ABSTRACT

This application provides a reference signal transmission method and transmission apparatus. The transmission method includes: obtaining, by a network device, reference information of a terminal device, where the reference information includes at least one of an identifier of the terminal device and scheduling information of the terminal device; determining, by the network device, a transmission parameter of a phase tracking reference signal (PTRS) of the terminal device based on the reference information, where the transmission parameter includes at least one of a sequence of the PTRS and a frequency domain position of the PTRS; and transmitting, by the network device, the PTRS with the terminal device based on the transmission parameter. According to the reference signal transmission method and transmission apparatus provided in embodi-
(Continued)

ments of this application, interference to the PTRS can be randomized.

17 Claims, 6 Drawing Sheets

Related U.S. Application Data continuation of application No. PCT/CN2018/091188, filed on Jun. 14, 2018.

(51) Int. Cl.
  *H04W 72/044* (2023.01)
  *H04W 72/0453* (2023.01)
  *H04W 72/1263* (2023.01)
  *H04W 72/50* (2023.01)
  *H04W 76/11* (2018.01)

(52) U.S. Cl.
  CPC ............... *H04W 72/0466* (2013.01); *H04W 72/1263* (2013.01); *H04W 72/535* (2023.01); *H04W 76/11* (2018.02)

(58) Field of Classification Search
  CPC ............ H04W 76/11; H04W 72/0453; H04W 72/0466; H04W 72/1257; H04W 72/1263
  See application file for complete search history.

(56) References Cited

U.S. PATENT DOCUMENTS

| | | |
|---|---|---|
| 2018/0091350 A1 | 3/2018 | Akkarakaran et al. |
| 2018/0287759 A1 | 10/2018 | Kundargi et al. |
| 2018/0331807 A1 | 11/2018 | Kim et al. |
| 2018/0351719 A1 | 12/2018 | Lee et al. |
| 2018/0368013 A1 | 12/2018 | Yoo et al. |
| 2019/0081752 A1 | 3/2019 | Hunukumbure et al. |
| 2019/0222385 A1 | 7/2019 | Hessler et al. |
| 2019/0312697 A1 | 10/2019 | Li et al. |
| 2020/0008102 A1 | 1/2020 | Yokomakura et al. |
| 2020/0008228 A1 | 1/2020 | Lee et al. |
| 2020/0052740 A1 | 2/2020 | Zhang et al. |
| 2020/0052930 A1 | 2/2020 | Kim et al. |
| 2020/0052939 A1 | 2/2020 | Xiong et al. |
| 2020/0076557 A1* | 3/2020 | Sun .................. H04W 24/10 |
| 2020/0106584 A1 | 4/2020 | Jiang et al. |
| 2020/0196332 A1 | 6/2020 | Yokomakura et al. |
| 2020/0213050 A1 | 7/2020 | Chen et al. |
| 2020/0220675 A1 | 7/2020 | Lee et al. |
| 2020/0235979 A1 | 7/2020 | Yokomakura et al. |
| 2020/0244503 A1 | 7/2020 | Bala et al. |
| 2020/0295893 A1 | 9/2020 | Maki et al. |
| 2020/0389270 A1 | 12/2020 | Lee et al. |
| 2021/0160025 A1* | 5/2021 | Gao .................. H04L 5/0094 |
| 2022/0407651 A1* | 12/2022 | Ye .................. H04L 5/005 |

FOREIGN PATENT DOCUMENTS

| | | |
|---|---|---|
| CN | 102437986 A | 5/2012 |
| CN | 103687042 A | 3/2014 |
| CN | 103702432 A | 4/2014 |
| CN | 104160766 A | 11/2014 |
| CN | 104349491 A | 2/2015 |
| CN | 105634707 A | 6/2016 |
| CN | 106375074 A | 2/2017 |
| EP | 0854624 B1 | 12/2004 |
| EP | 2575281 A2 | 4/2013 |
| EP | 2768190 A2 | 8/2014 |
| WO | 2018027222 A1 | 2/2018 |

OTHER PUBLICATIONS

XP051272358 R1-1707132 ZTE,:"Discussion on RS for phase tracking",3GPP TSG RAN WG1 Meeting #89,May 7, 2017,total 12 pages.
Samsung,"On DL PT-RS design",3GPP TSG RAN WG1 #89,R1-1707976,Hangzhou, China, May 15-19, 2017, total 5 pages.
U.S. Appl. No. 62/518,566, Specification (Year: 2017).
Qualcomm Incorporated, Phase and frequency tracking reference signal considerations. 3GPP TSG-RAN WG1 #89, May 15, 19, 2017, Hangzhou, P.R. China, R1-1708599, 7 pages.
3GPP TS 38.211 V0.0.0 (May 2017),3rd Generation Partnership Project;Technical Specification Group Radio Access Network;NR;Physical channels and modulation(Release 15), total 10 pages.
Cisco et al , TS V5G.211 V1.7 (Oct. 2016),Verizon 5G TF;Air Interface Working Group;Verizon 5th Generation Radio Access;Physical channels and modulation(Release 1), total 83 pages.
National Instruments , Discussion on explicit and implicit signaling for PT-RS. 3GPP TSG RAN WG1 Meeting #89, Hangzhou, P.R. of China, May 15, 19, 2017, R1-1708272, 11 pages.
LG Electronics, "Discussion on Phase Tracking RS for UL",3GPP TSG RAN WG1 NR ad-hoc R1-1700485,Spokane, USA Jan. 16-20, 2017,total 7 pages.
XP051272825 R1-1707617LG Electronics:"On UL PT-RS design", 3GPP TSG RAN WG1 Meeting #89, Hangzhou, P. R. China May 15, 19, 2017. 8 pages.
U.S. Appl. No. 62/519,424, Specification (Year: 2017).
Ge Xun et al., Design of Wireless Traffic Light Control System Based on PTR8000. Science and Technology Information, Issue 23, 2008, 2 pages.
3GPP TS 38.331 V0.0.3 (May 2017)3rd Generation Partnership Project;Technical Specification Group Radio Access Network; NR;Radio Resource Control (RRC);Protocol specification(Release 15), total 20 pages.
Cisco et al ,TS V5G.212 V1.5 (Sep. 2016),Verizon 5G TF;Air Interface Working Group;Verizon 5th Generation Radio Access;Multiplexing and channel coding(Release 1), total 62 pages.
Cisco et al ,TS V5G.213 v1.4 (Oct. 2016),Verizon 5G TF;Air Interface Working Group;Verizon 5th Generation Radio Access;Physical layer procedures(Release 1), total 50 pages.

\* cited by examiner

REFERENCE SIGNAL TRANSMISSION METHOD AND TRANSMISSION APPARATUS

CROSS-REFERENCE TO RELATED APPLICATIONS

This application is a continuation of U.S. patent application Ser. No. 16/716,183, filed on Dec. 16, 2019, which is a continuation of International Application No. PCT/CN2018/091188, filed on Jun. 14, 2018. The International Application claims priority to Chinese Patent Application No. 201710458494.1, filed on Jun. 16, 2017. All of the aforementioned patent applications are hereby incorporated by reference in their entireties.

TECHNICAL FIELD

This application relates to the communications field, and more specifically, to a reference signal transmission method and transmission apparatus in the communications field.

BACKGROUND

With development of network systems, there are increasing requirements for a communication rate and a capacity, and there are also increasing requirements for high-frequency resources. However, as a frequency increases, phase noise generated by a random jitter of a frequency device, namely, a local oscillator, also increases. Therefore, impact of phase noise in high-frequency wireless communication is not negligible. Usually, a transmit end device may add a phase tracking reference signal (phase tracking reference signal, PTRS) that is known in advance, and a receive end device can estimate phase noise based on the received PTRS.

However, because sequences of PTRSs of all receive end devices are the same in a same cell or sector, PTRSs of different terminal devices that are mapped to a same resource block interfere with each other, affecting estimation of phase noise. How to randomize interference to a PTRS has become a problem that needs to be urgently resolved.

SUMMARY

This application provides a reference signal transmission method and transmission apparatus, to help randomize interference to a PTRS.

According to a first aspect, this application provides a reference signal transmission method. The transmission method includes:

determining, by a network device, a transmission parameter of a phase tracking reference signal (PTRS) of a terminal device based on reference information of the terminal device, where the reference information includes at least one of an identifier of the terminal device and scheduling information of the terminal device, and the transmission parameter includes at least one of a sequence of the PTRS and a frequency domain position of the PTRS; and transmitting, by the network device, the PTRS with the terminal device based on the transmission parameter.

It should be understood that, the transmission method may be applied to an uplink transmission scenario of a reference signal, or may be applied to a downlink transmission scenario of a reference signal.

In the downlink transmission scenario, the transmitting, by the network device, the PTRS with the terminal device based on the transmission parameter may be understood as: sending, by the network device, the PTRS to the terminal device based on the transmission parameter.

In an optional embodiment, the network device may determine, based on an index of a subcarrier/resource element (resource element, RE) corresponding to the frequency domain position of the PTRS, an index that corresponds to the index of the subcarrier/RE and that is of a physical resource block (physical resource block, PRB) in which the subcarrier/RE is located. The network device selects, from the sequence of the PTRS based on the index of the PRB, a symbol corresponding to the index of the PRB, and maps the symbol to the subcarrier/RE corresponding to the frequency domain position.

It should be understood that, when the network device allocates N virtual resource blocks (virtual resource block, VRB) to the terminal device, in ascending order of indexes of the N VRBs, the N VRBs sequentially correspond to N consecutive relative resource blocks (resource block, RB), and indexes of the N relative RBs are 0, 1, . . . , and N−1, where N is an integer greater than 0. For example, four VRBs with indexes of 0, 1, 6, and 7 are allocated by the network device to the terminal device, and in ascending order of the indexes, the four VRBs correspond to four relative RBs with indexes of 0, 1, 2, and 3.

It should be further understood that, in this embodiment of this application, the frequency domain position of the PTRS may be understood as a frequency domain position of the PTRS in the N relative RBs.

Optionally, the network device or the terminal device can determine, based on a correspondence between a relative RB and a VRB and a preset correspondence between a VRB and a PRB, an index of a physical subcarrier/an RE corresponding to the frequency domain position of the PTRS, and an index that corresponds to the index of the physical subcarrier/RE and that is of a PRB in which the physical subcarrier/RE is located.

In the uplink transmission scenario, the transmitting, by the network device, the PTRS with the terminal device based on the transmission parameter may be understood as: receiving, by the network device based on the transmission parameter, the PTRS sent by the terminal device. Optionally, after the network device receives the PTRS sent by the terminal device, the network device may estimate phase noise based on the PTRS.

In an optional embodiment, the network device may determine, based on an index of a subcarrier/RE corresponding to the frequency domain position of the PTRS, an index that corresponds to the index of the subcarrier/RE and that is of a PRB in which the subcarrier/RE is located. The network device obtains, from the subcarrier/RE in the PRB, a symbol corresponding to the index of the PRB, and estimates phase noise based on the obtained symbol and the sequence of the PTRS.

According to the reference signal transmission method provided in this embodiment of this application, the sequence of the PTRS of the terminal device is determined based on the reference information of the terminal device, so that the sequence of the PTRS of the terminal device can be different from a sequence of a PTRS of another terminal device, and randomness of interference to the PTRS of the terminal device is improved by using randomness of the PTRS of the another terminal device, to help randomize the interference to the PTRS of the terminal device, thereby helping stabilize performance of estimating noise by using the PTRS.

In addition, according to the reference signal transmission method provided in this embodiment of this application, because a multi-user multiple-input multiple-output (multi-user multiple-input multiple-output, MU-MIMO) technology supports non-orthogonal multiplexing between PTRS ports and between a PTRS port and data, the frequency domain position of the PTRS of the terminal device is determined based on the reference information of the terminal device. In this way, PTRSs of paired terminal devices can be mapped to different frequency domain positions by introducing an RB-level frequency domain offset or a resource element (resource element, RE)—level frequency domain offset. That is, the interference to the PTRS of the terminal device comes from data of the another terminal device, and the randomness of the interference to the PTRS of the terminal device is improved by using randomness of the data of the another terminal device, to help randomize the interference to the PTRS of the terminal device, thereby helping stabilize the performance of estimating noise by using the PTRS.

It should be understood that, the network device and the terminal device may estimate the phase noise based on the PTRS, or may estimate the phase noise based on a phase compensation reference signal (phase compensation reference signal, PCRS). The PTRS and the PCRS are collectively referred to as a PTRS in this embodiment of this application, but this is not limited in this embodiment of this application.

In a possible implementation, when the transmission parameter includes the sequence of the PTRS, the determining, by a network device, a transmission parameter of a phase tracking reference signal PTRS of a terminal device based on reference information of the terminal device includes: determining, by the network device, a scrambling value of the sequence of the PTRS based on the reference information; and determining, by the network device, the sequence of the PTRS based on the scrambling value.

In another possible implementation, when the transmission parameter includes the frequency domain position of the PTRS, the determining, by a network device, a transmission parameter of a phase tracking reference signal PTRS of a terminal device based on reference information of the terminal device includes: determining, by the network device, an offset of the frequency domain position of the PTRS based on the reference information; and determining, by the network device, the frequency domain position of the PTRS based on the offset.

In still another possible implementation, when the transmission parameter includes the frequency domain position of the PTRS, a frequency domain position that is of a mapped $M^{th}$ PTRS in a relative RB and that is indicated by the transmission parameter may be $\{\Delta f + M*N\}$, where $\Delta f$ indicates the offset of the frequency domain position, a value range of $\Delta f$ is 0 1, 2, . . . , and N−1, N indicates a frequency domain interval of the PTRS, and M is an integer greater than or equal to 0.

For example, if each RB corresponds to one symbol in a sequence, assuming that a frequency domain density is one PTRS mapped to every four RBs, the first mapped PTRS corresponds to one of symbol 0 to the symbol 3 in the sequence, and the second mapped PTRS corresponds to one of symbol 4 to symbol 7 in the sequence.

In still another possible implementation, the determining, by a network device, a transmission parameter of a phase tracking reference signal (PTRS) of a terminal device based on reference information of the terminal device includes: determining, by the network device, the transmission parameter based on the reference information and a first mapping relationship, where the first mapping relationship includes a correspondence between the reference information and the transmission parameter.

Optionally, the network device and the terminal device may pre-agree on the first mapping relationship, for example, may agree on the first mapping relationship in a protocol, or before the network device transmits the PTRS with the terminal device, the network device indicates the first mapping relationship to the terminal device. This is not limited in this embodiment of this application.

In still another possible implementation, before the transmitting, by the network device, the PTRS with the terminal device based on the transmission parameter, the transmission method further includes: sending, by the network device, the first mapping relationship to the terminal device.

Optionally, the network device may send the first mapping relationship to the terminal device by using first signaling.

Optionally, the first signaling may be radio resource control (radio resource control, RRC) signaling, media access control (media access control, MAC) control element (control element, CE) signaling, or downlink control information (downlink control information, DCI) signaling. This is not limited in this embodiment of this application.

According to the reference information transmission method provided in this embodiment of this application, the network device sends the first mapping relationship to the terminal device by using the first signaling, and correspondingly, the terminal device can determine the transmission parameter based on the reference information and the first mapping relationship, so that the network device does not need to send the transmission parameter to the terminal device each time when the network device transmits a PTRS, thereby reducing signaling overheads.

In still another possible implementation, before the transmitting, by the network device, the PTRS with the terminal device based on the transmission parameter, the transmission method further includes: sending, by the network device, the transmission parameter to the terminal device.

Optionally, the network device may send the transmission parameter to the terminal device by using second signaling.

Optionally, the second signaling may be radio resource control (radio resource control, RRC) signaling, media access control (media access control, MAC) control element (control element, CE) signaling, or downlink control information (downlink control information, DCI) signaling. This is not limited in this embodiment of this application.

According to the reference information transmission method provided in this embodiment of this application, the network device directly sends the transmission parameter to the terminal device by using signaling, where the signaling is simple and has low complexity.

In still another possible implementation, the scheduling information of the terminal device includes at least one of the following information: scheduling information of a demodulation reference signal (DMRS), scheduling information of the PTRS, scheduling information of a sounding reference signal (SRS), and scheduling information of a codeword.

Optionally, the scheduling information of the DMRS may be a DMRS port number, a DMRS port quantity, a DMRS port pattern, resource element mapping, a subcarrier index to which the DMRS is mapped, or a resource element to which the DMRS is mapped; the scheduling information of the PTRS may be a PTRS port number, a PTRS port quantity, a PTRS frequency domain density, or resource element mapping; the scheduling information of the SRS may be an SRS port number, an SRS port quantity, an SRS port pattern, resource element mapping, a subcarrier index to which the SRS is mapped, or a resource element to which the SRS is mapped; and the scheduling information of the codeword may be a codeword number or a codeword quantity of the codeword.

According to a second aspect, this application provides another reference signal transmission method. The transmission method includes:

obtaining, by a terminal device, a transmission parameter of a phase tracking reference signal (PTRS), where the transmission parameter includes at least one of a sequence of the PTRS and a frequency domain position of the PTRS, the transmission parameter is determined based on reference information of the terminal device, and the reference information includes at least one of an identifier of the terminal device and scheduling information of the terminal device; and transmitting, by the terminal device, the PTRS with a network device based on the transmission parameter.

It should be understood that, the transmission method may be applied to an uplink transmission scenario of a reference signal, or may be applied to a downlink transmission scenario of a reference signal.

Optionally, in the uplink transmission scenario, the transmitting, by the terminal device, the PTRS with a network device based on the transmission parameter may be understood as: sending, by the terminal device, the PTRS to the network device based on the transmission parameter.

In an optional embodiment, the terminal device may determine, based on an index of a subcarrier/an RE corresponding to the frequency domain position of the PTRS, an index that corresponds to the index of the subcarrier/RE and that is of a PRB in which the subcarrier/RE is located. The terminal device selects, from the sequence of the PTRS based on the index of the PRB, a symbol corresponding to the index of the PRB, and maps the symbol to the subcarrier/RE corresponding to the frequency domain position.

It should be understood that, when the network device allocates N virtual resource blocks (virtual resource block, VRB) to the terminal device, in ascending order of indexes of the N VRBs, the N VRBs sequentially correspond to N consecutive relative resource blocks (resource block, RB), and indexes of the N relative RBs are 0, 1, . . . , and N−1, where N is an integer greater than 0. For example, four VRBs with indexes of 0, 1, 6, and 7 are allocated by the network device to the terminal device, and in ascending order of the indexes, the four VRBs correspond to four relative RBs with indexes of 0, 1, 2, and 3.

It should be further understood that, in this embodiment of this application, the frequency domain position of the PTRS may be understood as a frequency domain position of the PTRS in the N relative RBs.

Optionally, the network device or the terminal device can determine, based on a correspondence between a relative RB and a VRB and a preset correspondence between a VRB and a PRB, an index of a physical subcarrier/an RE corresponding to the frequency domain position of the PTRS, and an index that corresponds to the index of the physical subcarrier/RE and that is of a PRB in which the physical subcarrier/RE is located.

Optionally, in the downlink transmission scenario, the transmitting, by the terminal device, the PTRS with a network device based on the transmission parameter may be understood as: receiving, by the terminal device based on the transmission parameter, the PTRS send by the network device. Optionally, after the terminal device receives the PTRS sent by the network device, the terminal device may estimate phase noise based on the PTRS.

In an optional embodiment, the terminal device may determine, based on an index of a subcarrier/RE corresponding to the frequency domain position of the PTRS, an index that corresponds to the index of the subcarrier/RE and that is of a PRB in which the subcarrier/RE is located. The terminal device obtains, from the subcarrier/RE in the PRB, a symbol corresponding to the index of the PRB, and estimates phase noise based on the obtained symbol and the sequence of the PTRS.

According to the reference signal transmission method provided in this embodiment of this application, the sequence of the PTRS of the terminal device is determined based on the reference information of the terminal device, so that the sequence of the PTRS of the terminal device can be different from a sequence of a PTRS of another terminal device, and randomness of interference to the PTRS of the terminal device is improved by using randomness of the PTRS of the another terminal device, to help randomize the interference to the PTRS of the terminal device, thereby helping stabilize performance of estimating noise by using the PTRS.

In addition, according to the reference signal transmission method provided in this embodiment of this application, because a multi-user multiple-input multiple-output (multi-user multiple-input multiple-output, MU-MIMO) technology supports non-orthogonal multiplexing between PTRS ports and between a PTRS port and data, the frequency domain position of the PTRS of the terminal device is determined based on the reference information of the terminal device. In this way, PTRSs of paired terminal devices can be mapped to different frequency domain positions by introducing an RB-level frequency domain offset or a resource element (resource element, RE)-level frequency domain offset. That is, the interference to the PTRS of the terminal device comes from data of the another terminal device, and the randomness of the interference to the PTRS of the terminal device is improved by using randomness of the data of the another terminal device, to help randomize the interference to the PTRS of the terminal device, thereby helping stabilize the performance of estimating noise by using the PTRS.

In a possible implementation, the obtaining, by a terminal device, a transmission parameter of a phase tracking reference signal (PTRS) includes: determining, by the terminal device, the transmission parameter based on the reference information.

In another possible implementation, when the transmission parameter includes the sequence of the PTRS, the determining, by the terminal device, the transmission parameter based on the reference information includes: determining, by the terminal device, a scrambling value of the sequence of the PTRS based on the reference information; and determining, by the terminal device, the sequence of the PTRS based on the scrambling value.

In still another possible implementation, when the transmission parameter includes the frequency domain position of the PTRS, the determining, by the terminal device, the transmission parameter based on the reference information includes: determining, by the terminal device, an offset of the frequency domain position of the PTRS based on the reference information; and determining, by the terminal device, the frequency domain position of the PTRS based on the offset.

In still another possible implementation, when the transmission parameter includes the frequency domain position of the PTRS, a frequency domain position that is of a mapped $M^{th}$ PTRS and that is indicated by the transmission parameter may be $\{\Delta f+M*N\}$, where $\Delta f$ indicates the offset of the frequency domain position, a value range of $\Delta f$ is 0 1, 2, . . . , and N−1, N indicates a frequency domain interval of the PTRS, and M is an integer greater than or equal to 0.

For example, if each RB corresponds to one symbol in a sequence, assuming that a frequency domain density is one PTRS mapped to every four RBs, the first mapped PTRS corresponds to one of symbol 0 to symbol 3 in the sequence, and the second mapped PTRS corresponds to one of symbol 4 to symbol 7 in the sequence.

In still another possible implementation, the determining, by the terminal device, the transmission parameter based on the reference information includes: determining, by the terminal device, the transmission parameter based on the reference information and a first mapping relationship, where the first mapping relationship includes a correspondence between the reference information and the transmission parameter.

Optionally, the network device and the terminal device may pre-agree on the first mapping relationship, for example, may agree on the first mapping relationship in a protocol, or before the network device transmits the PTRS with the terminal device, the network device indicates the first mapping relationship to the terminal device. This is not limited in this embodiment of this application.

In still another possible implementation, before the determining, by the terminal device, the transmission parameter based on the reference information and a first mapping relationship, the transmission method further includes: receiving, by the terminal device, the first mapping relationship sent by the network device.

Optionally, the terminal device may receive the first mapping relationship that is sent by the network device by using first signaling.

Optionally, the first signaling may be radio resource control (radio resource control, RRC) signaling, media access control (media access control, MAC) control element (control element, CE) signaling, or downlink control information (downlink control information, DCI) signaling. This is not limited in this embodiment of this application.

According to the reference information transmission method provided in this embodiment of this application, the terminal device receives the first mapping relationship that is sent by the network device by using the first signaling, so that the terminal device can determine the transmission parameter based on the reference information and the first mapping relationship, and does not need to receive, each time when the terminal device transmits a PTRS, the transmission parameter sent by the network device, thereby reducing signaling overheads.

In still another possible implementation, the obtaining, by a terminal device, a transmission parameter of a phase tracking reference signal (PTRS) includes: receiving, by the terminal device, the transmission parameter sent by the network device.

Optionally, the terminal device may receive the transmission parameter that is sent by the network device by using second signaling.

Optionally, the second signaling may be radio resource control (radio resource control, RRC) signaling, media access control (media access control, MAC) control element (control element, CE) signaling, or downlink control information (downlink control information, DCI) signaling. This is not limited in this embodiment of this application.

According to the reference information transmission method provided in this embodiment of this application, the terminal device directly receives, by using signaling, the transmission parameter sent by the network device, where the signaling is simple and has low complexity.

In still another possible implementation, the scheduling information of the terminal device includes at least one of the following information: scheduling information of a demodulation reference signal (DMRS), scheduling information of the PTRS, scheduling information of a sounding reference signal (SRS), and scheduling information of a codeword.

Optionally, the scheduling information of the DMRS may be a DMRS port number, a DMRS port quantity, a DMRS port pattern, resource element mapping, a subcarrier index to which the DMRS is mapped, or a resource element to which the DMRS is mapped; the scheduling information of the PTRS may be a PTRS port number, a PTRS port quantity, a PTRS frequency domain density, or resource element mapping; the scheduling information of the SRS may be an SRS port number, an SRS port quantity, an SRS port pattern, resource element mapping, a subcarrier index to which the SRS is mapped, or a resource element to which the SRS is mapped; and the scheduling information of the codeword may be a codeword number or a codeword quantity of the codeword.

According to a third aspect, this application provides a reference signal transmission apparatus, configured to perform the transmission method according to any one of the first aspect or the possible implementations of the first aspect.

According to a fourth aspect, this application provides a reference signal transmission apparatus, configured to perform the transmission method according to any one of the second aspect or the possible implementations of the second aspect.

According to a fifth aspect, this application provides a reference signal transmission apparatus. The transmission apparatus includes a memory, a processor, a transceiver, and a computer program stored in the memory and capable of running on the processor, and when executing the computer program, the processor performs the transmission method according to any one of the first aspect or the possible implementations of the first aspect.

According to a sixth aspect, this application provides a reference signal transmission apparatus. The transmission apparatus includes a memory, a processor, a transceiver, and a computer program stored in the memory and capable of running on the processor, and when executing the computer program, the processor performs the transmission method according to any one of the second aspect or the possible implementations of the second aspect.

According to a seventh aspect, this application provides a computer-readable medium, configured to store a computer program, where the computer program includes an instruction used to perform the transmission method according to any one of the first aspect or the possible implementations of the first aspect.

According to an eighth aspect, this application provides a computer-readable medium, configured to store a computer program, where the computer program includes an instruction used to perform the transmission method according to any one of the second aspect or the possible implementations of the second aspect.

According to a ninth aspect, this application provides a computer program product including an instruction. When the instruction is run on a computer, the computer is enabled to perform the transmission method according to any one of the first aspect or the possible implementations of the first aspect.

According to a tenth aspect, this application provides a computer program product including an instruction. When the instruction is run on a computer, the computer is enabled to perform the transmission method according to any one of the second aspect or the possible implementations of the second aspect.

According to an eleventh aspect, this application provides a communications chip, storing an instruction. When the instruction is run on a network device or a terminal device, the network device or the terminal device is enabled to perform the method according to each of the foregoing aspects.

DESCRIPTION OF EMBODIMENTS

The following describes technical solutions of this application with reference to the accompanying drawings.

It should be understood that, the technical solutions of the embodiments of this application may be applied to various communications systems, such as: a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communications system, a wireless local area network (wireless local area network, WLAN), or a future fifth generation (the fifth Generation, 5G) wireless communications system.

Figure 1:
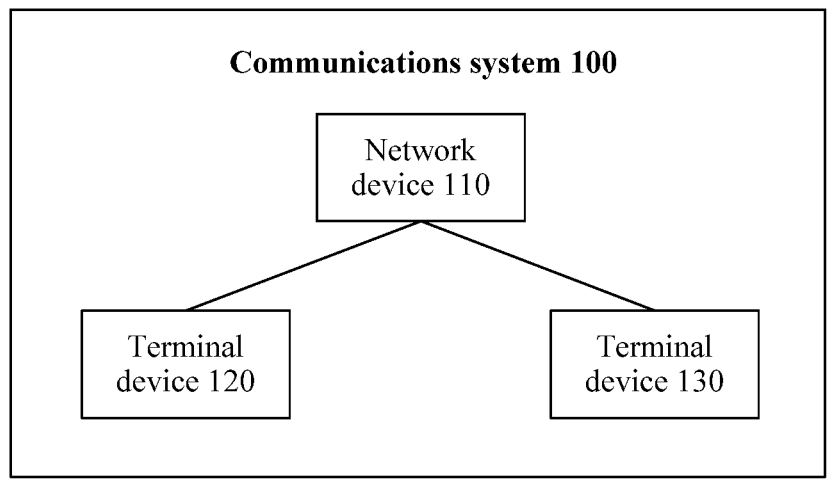
FIG. 1 is a schematic architectural diagram of a communications system according to an embodiment of this application.

FIG. 1 is a schematic architectural diagram of a communications system 100 according to an embodiment of this application. As shown in FIG. 1, the communications system 100 may include at least one network device (a network device 110 is shown in FIG. 1) and a plurality of terminal devices (a terminal device 120 and a terminal device 130 are shown in FIG. 1). The at least one network device can perform wireless communication with the plurality of terminal devices.

Optionally, the network device can provide communication coverage for a particular geographic area and can communicate with UE within the coverage. The network device may be a base transceiver station (base transceiver station, BTS) in a GSM system or a CDMA system, or may be a NodeB (nodeB, NB) in a WCDMA system, or may be an evolved NodeB (evolved NodeB, eNB or eNodeB) in an LTE system, or a radio controller in a cloud radio access network (cloud radio access network, CRAN). The network device may alternatively be a core network, a relay node, an access point, a vehicle-mounted device, a wearable device, a network side device in a future 5G network, a network device in a future evolved public land mobile network (public land mobile network, PLMN), or the like.

Optionally, the terminal device may be mobile or fixed. The terminal device may also refer to an access terminal, user equipment (user equipment, UE), a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved PLMN, or the like.

FIG. 1 shows an example of one network device and two terminal devices. Optionally, the communications system 100 may alternatively include a plurality of network devices and another quantity of terminal devices may be included within coverage of each network device. This is not limited in this embodiment of this application. Optionally, the communications system 100 may further include another network entity such as a network controller or a mobility management entity. This embodiment of this application is not limited thereto.

It should be understood that, the network device and the terminal device may estimate phase noise based on a PTRS, or may estimate phase noise based on a phase compensation reference signal (phase compensation reference signal, PCRS). The PTRS and the PCRS are collectively referred to as a PTRS in this embodiment of this application, but this is not limited in this embodiment of this application.

It should be understood that, that a PTRS frequency domain density is 1/n may be understood as that a PTRS is mapped to one subcarrier in every n resource blocks (resource block, RB), that is, when each RB includes 12 subcarriers, a frequency domain interval of a PTRS is 12*n subcarriers. A value of n may be, for example, 1, 2, 4, 8, or 16. This is not limited in this embodiment of this application.

In the prior art, the network device and the terminal device may transmit a PTRS through a port (port) 60 and/or a port 61. An offset of a frequency domain position of a PTRS that corresponds to the port 60 is 23 subcarriers, and an offset of a frequency domain position of a PTRS that corresponds to the port 61 is 24 subcarriers.

Figure 2:
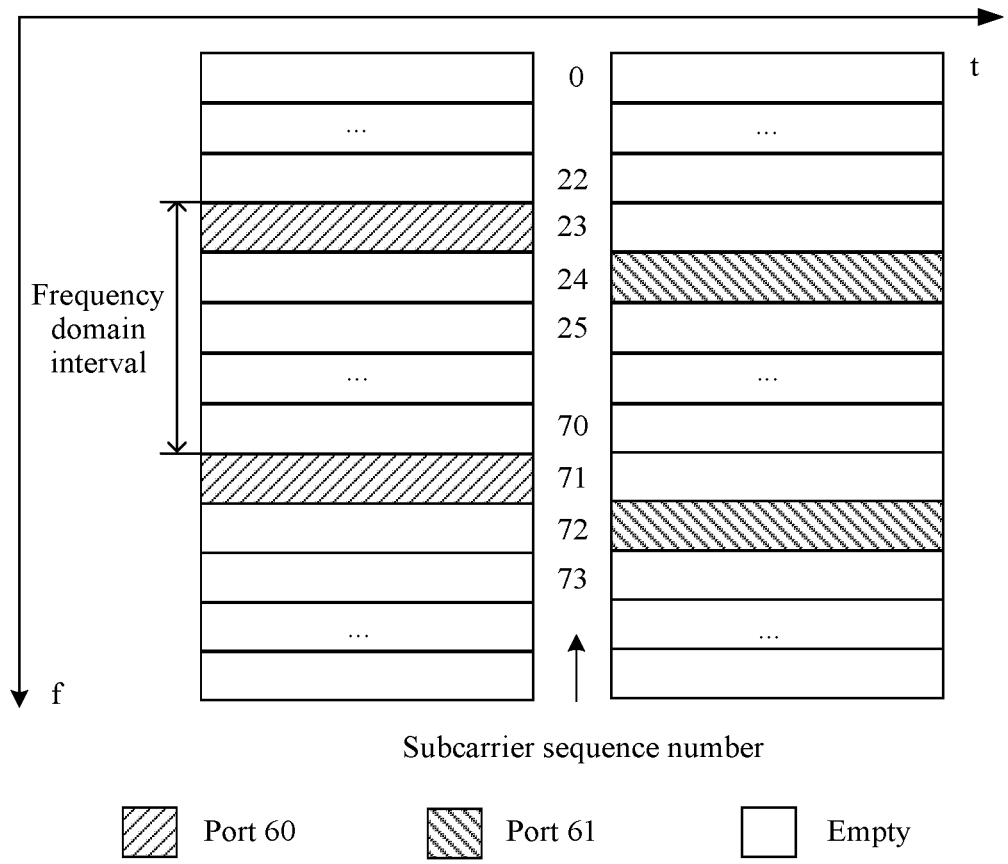
FIG. 2 is a schematic diagram of a PTRS frequency domain density of a reference signal according to an embodiment of this application.

For example, as shown in FIG. 2, it is assumed that the PTRS frequency domain density is ¼, and when each RB includes 12 subcarriers, the frequency domain interval of the PTRS is 48 subcarriers. When the network device and the terminal device transmit PTRSs through the port 60, the PTRSs are sequentially mapped to subcarriers with indexes of 23, 23+1*48, 23+2*48, . . . , and 23+m*48; and when the network device and the terminal device transmit PTRSs through the port 61, the PTRSs are sequentially mapped to subcarriers with indexes of 24, 24+1*48, 24+2*48, . . . , and 24+m*48, where m is an integer greater than or equal to 0.

In the prior art, terminal devices in a same cell/sector each generate a sequence of the PTRS of the terminal device based on a scrambling value of the sequence of the PTRS that is configured by the network device or by using an identifier of the cell/sector as a scrambling value of the sequence of the PTRS. That is, all the terminal devices in the cell/sector have a same sequence of the PTRS. When a first terminal device and a second terminal device that are in the cell/sector and for which a same resource is scheduled or that have an overlapping scheduled resource both transmit a PTRS through a same port, a frequency domain position to which a PTRS of the first terminal device is mapped overlaps a frequency domain position to which a PTRS of the second terminal device is mapped. In this case, PTRS signals received on same subcarriers of the first terminal device and the second terminal device interfere with each other. Consequently, performance of estimating phase noise by using the PTRS is unstable. To stabilize performance of estimating phase noise by using a PTRS of each terminal device, interference to the PTRS needs to be randomized.

According to the reference signal transmission method provided in this embodiment of this application, the network device and the terminal device may transmit a PTRS of the terminal device based on a transmission parameter of the PTRS of the terminal device, where the transmission parameter includes a sequence and/or a frequency domain position of the PTRS, the transmission parameter is determined based on reference information of the terminal device, and the reference information includes an identifier of the terminal device and/or scheduling information of the terminal device, to help randomize interference to the PTRS, thereby stabilizing performance of estimating phase noise by using the PTRS.

Figure 3:
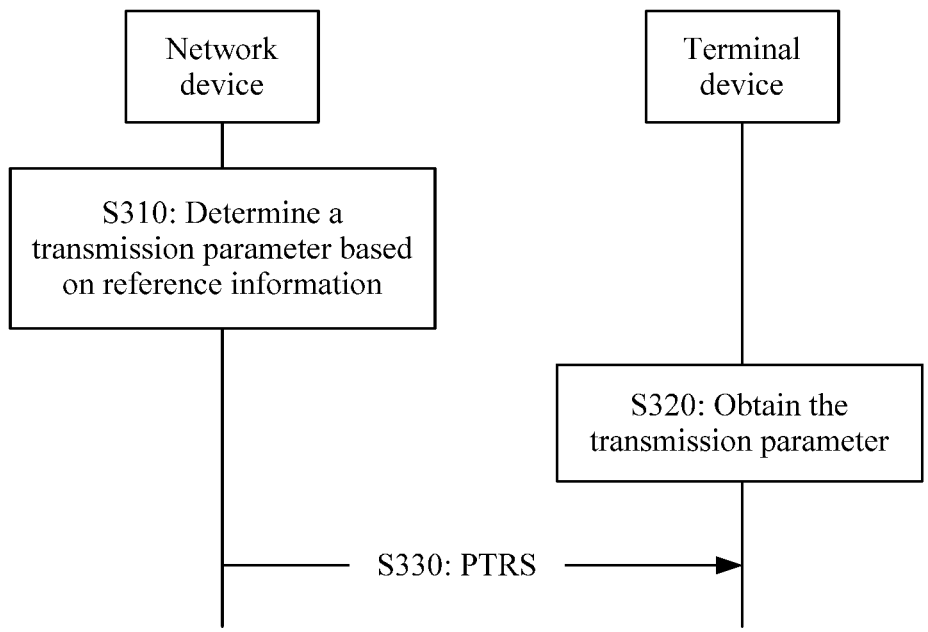
FIG. 3 is a schematic flowchart of a reference signal transmission method according to an embodiment of this application.

FIG. 3 is a schematic flowchart of a reference signal transmission method 300 according to an embodiment of this application. The transmission method 300 may be applied to the communications system 100 shown in FIG. 1, for example, may be applied to a downlink transmission scenario of a reference signal.

S310: A network device determines a transmission parameter of a PTRS of a terminal device based on reference information of the terminal device, where the reference information includes at least one of an identifier of the terminal device and scheduling information of the terminal device, and the transmission parameter includes at least one of a sequence of the PTRS and a frequency domain position of the PTRS.

Optionally, the reference information may include at least one of the identifier of the terminal device and the scheduling information of the terminal device. The identifier of the terminal device may be allocated by the network device to the terminal device when the terminal device accesses a network of the network device. The scheduling information of the terminal device may be an uplink/downlink resource scheduled by the network device for the terminal device. This is not limited in this embodiment of this application.

Optionally, before S310, the network device may obtain the identifier of the terminal device when the terminal device accesses the network. Before S310, the network device may allocate the scheduling information to the terminal device, and send the scheduling information to the terminal device. Correspondingly, the terminal device may receive the scheduling information sent by the network device.

For example, the identifier of the terminal device may include at least one of the following identifiers: a cell-radio network temporary identifier (cell-radio network temporary identifier, C-RNTI), a random access response temporary identifier (random access response temporary identifier, RA-RNTI), a temporary C-RNTI, or a transmit power control temporary identifier (transmit power control temporary identifier, TPC-RNTI). This is not limited in this embodiment of this application.

For another example, the scheduling information of the terminal device may include at least one of the following information: scheduling information of a demodulation reference signal (demodulation reference signal, DMRS), scheduling information of the PTRS, scheduling information of a sounding reference signal (sounding reference signal, SRS), and scheduling information of a codeword. This is not limited in this embodiment of this application.

The scheduling information of the DMRS may be a DMRS port number, a DMRS port quantity, a DMRS port pattern, resource element mapping (resource element mapping), or a DMRS subcarrier index/resource element; the scheduling information of the PTRS may be a PTRS port number, a port quantity, a port frequency domain density, or resource element mapping; the scheduling information of the SRS may be an SRS port number, an SRS port quantity, an SRS port pattern, resource element mapping, or an SRS subcarrier index/resource element; and the scheduling information of the codeword may be a codeword number or a codeword quantity of the codeword.

It should be understood that, the DMRS may be a DMRS associated with the PTRS, that is, the DMRS and the PTRS use a same precoding matrix.

Optionally, the determining, by a network device, a transmission parameter of a PTRS of a terminal device based on reference information of the terminal device may be: determining, by the network device, the transmission parameter based on the reference information and a first mapping relationship.

Optionally, the network device and the terminal device may pre-agree on the first mapping relationship, for example, may agree on the first mapping relationship in a protocol, or before the network device sends the PTRS to the terminal device, the network device indicates the first mapping relationship to the terminal device by using higher layer signaling. This is not limited in this embodiment of this application.

Optionally, when the reference information includes the sequence of the PTRS of the terminal device, the determining, by a network device, a transmission parameter of a PTRS of a terminal device based on reference information of the terminal device may be: determining, by the network device, a scrambling value of the sequence of the PTRS of the terminal device based on the reference information of the terminal device; and generating, by the network device, the sequence of the PTRS of the terminal device based on the scrambling value.

Optionally, when the reference information includes the offset of the frequency domain position of the PTRS of the terminal device, the determining, by a network device, a transmission parameter of a PTRS of a terminal device based on reference information of the terminal device may be: determining, by the network device, the offset of the frequency domain position of the PTRS of the terminal device based on the reference information of the terminal device; and generating, by the network device, the frequency domain position of the PTRS of the terminal device based on the offset.

Optionally, a unit of the offset of the frequency domain position of the PTRS may be an RB or an RE. For example, when the unit of the offset f_offset is an RB, and one RB includes 12 subcarriers, the offset of the frequency domain position is f_offset*12.

It should be understood that, when the network device allocates N virtual resource blocks (virtual resource block, VRB) to the terminal device, in ascending order of indexes of the N VRBs, the N VRBs sequentially correspond to N consecutive relative resource blocks (resource block, RB), and indexes of the N relative RBs are 0, 1, . . . , and N−1, where N is an integer greater than 0. For example, four VRBs with indexes of 0, 1, 6, and 7 are allocated by the network device to the terminal device, and in ascending order of the indexes, the four VRBs correspond to four relative RBs with indexes of 0, 1, 2, and 3.

It should be further understood that, in this embodiment of this application, the frequency domain position of the PTRS may be understood as a frequency domain position of the PTRS in the N relative RBs.

Optionally, when the transmission parameter includes a frequency domain position of the PTRS in a relative RB, a frequency domain position of a mapped $M^{th}$ PTRS in a relative RB that is indicated by the transmission parameter may be $\{\Delta f+M*N\}$, where $\Delta f$ indicates the offset of the frequency domain position, a value range of $\Delta f$ is 0, 1, 2, . . . and N−1, N indicates a frequency domain interval of the PTRS, and M is an integer greater than or equal to 0.

For example, if each RB corresponds to one symbol in a sequence, assuming that a frequency domain density is one PTRS mapped to every four RBs, the first mapped PTRS corresponds to one of symbol 0 to symbol 3 in the sequence, and the second mapped PTRS corresponds to one of symbol 4 to symbol 7 in the sequence.

In an optional embodiment, when the reference information includes the identifier (identifier, ID) of the terminal device, the offset f_offset 1 of the frequency domain position of the PTRS of the terminal device is equal to $f_{11}$ (the ID of the terminal device), and the scrambling value n_SC 1 of the sequence of the PTRS of the terminal device is equal to $f_{12}$ (the ID of the terminal device), where $f_{11}$ and $f_{12}$ are functions, a function of $f_{11}$ is to map the ID of the terminal device to the offset of the frequency domain position of the PTRS of the terminal device, and a function $f_{12}$ is to map the ID of the terminal device to the scrambling value of the sequence of the PTRS of the terminal device.

It should be understood that, a possible value range of a frequency offset is smaller than a value range of the ID of the terminal device, for example, there are $2^{16}$ C-RNTIs, and there are a maximum of 192 frequency offsets. Therefore, the function $f_{11}$ may be, for example:
  (a) a modulo operation, for example, mod (terminal ID, M), where a value of M may be 12, 24, 48, . . . , and so on; or
  (b) a right shifting operation or removal of some bits from the ID of the terminal, for example, right shifting (terminal ID, N), where N indicates a quantity of bits by which the right shifting is performed, and a value may be 9, 10, 11, . . . , and so on.

Because $f_{12}$ and $f_{11}$ have a similar principle, to avoid repetition, details are not described herein again.

In another optional embodiment, when the reference information includes the DMRS port number/quantity/pattern/resource element/subcarrier index, the offset f_offset 2 of the frequency domain position of the PTRS of the terminal device is equal to $f_{21}$ (the DMRS port number/quantity/pattern/subcarrier index), the scrambling value n_SC 2 of the sequence of the PTRS of the terminal device is equal to $f_{22}$ (the DMRS port number/quantity/pattern/subcarrier index), where $f_{21}$ and $f_{22}$ are functions, a function of $f_{21}$ is to map the DMRS port number/quantity/pattern/subcarrier index to the offset of the frequency domain position of the PTRS of the terminal device, and a function of $f_{22}$ is to map the DMRS port number/quantity/pattern/subcarrier index to the scrambling value of the sequence of the PTRS of the terminal device.

Figure 4:
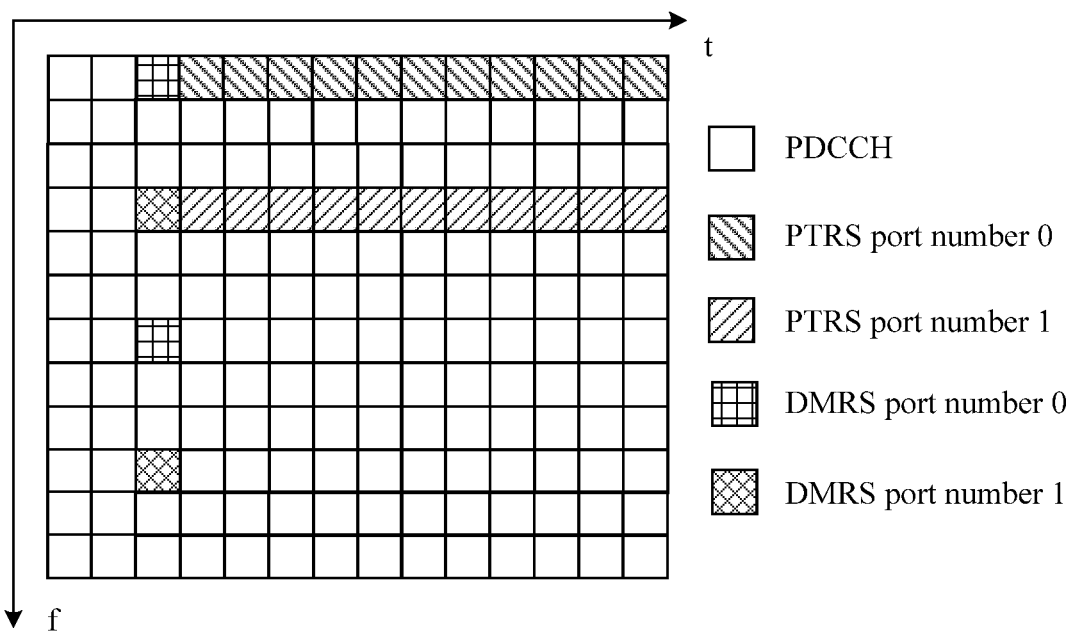
FIG. 4 is a schematic diagram of frequency domain positions to which a DMRS port and a PTRS port are mapped according to an embodiment of this application.
Figure 5:
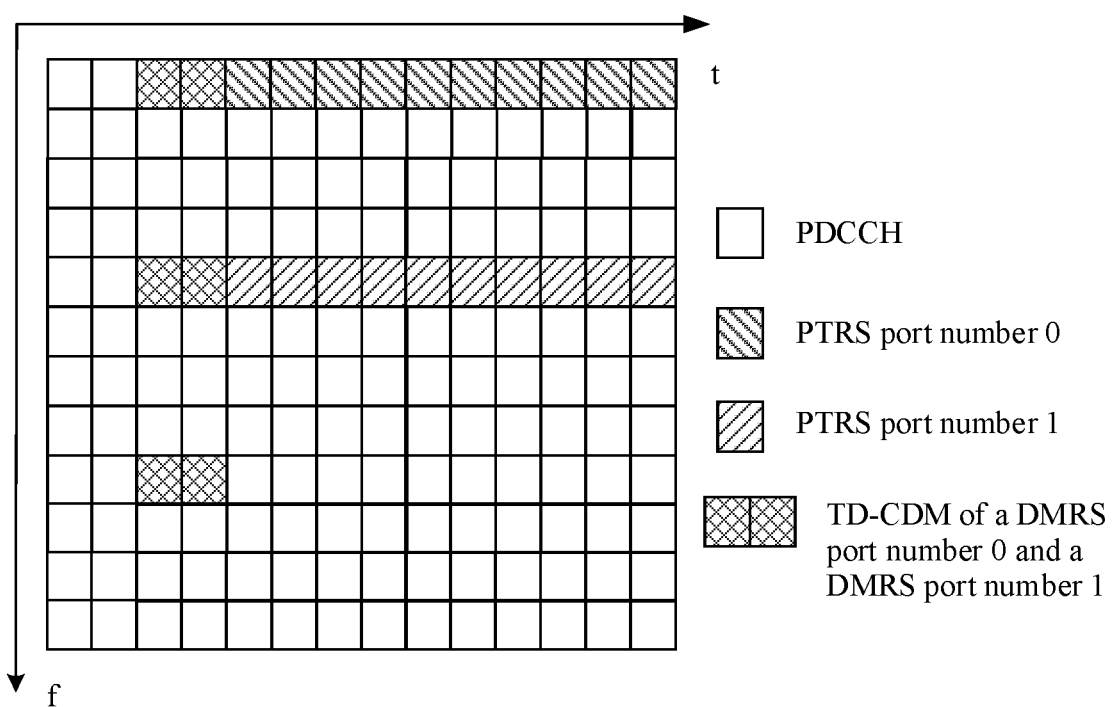
FIG. 5 is another schematic diagram of frequency domain positions to which a DMRS port and a PTRS port are mapped according to an embodiment of this application.

It should be understood that, the mapping relationship may be a one-to-one correspondence or a one-to-multiple correspondence, DMRS port numbers may be in a one-to-one correspondence with PTRS port numbers, a DMRS port quantity is usually greater than or equal to a PTRS port quantity, and a DMRS frequency domain density is greater than a PTRS frequency domain density. Therefore, the function $f_{21}$ may be, for example:
  (a) f_offset 2=L*(DMRS port number−minimum DMRS port number); or f_offset 2=L*floor ((DMRS port number−minimum DMRS port number)/2), where L indicates a frequency domain interval between different DMRS ports, as shown in FIG. 4; or
  (b) f_offset 3=floor ((DMRS port number−minimum DMRS port number)/2)+RE_DMRS(i), where i=the DMRS port number−the minimum DMRS port number, RE_DMRS is a subcarrier number or a resource element number of the DMRS, that is, when two DMRS ports associated with a PTRS port are time domain-code division multiplexed (time domain-code division multiplexing, TD-CDM), different DMRS RE numbers may be configured for frequency offsets of different PTRS ports, for example, RE_DMRS(0)=0 and RE_DMRS(1)=K, where K is a frequency domain interval of the DMRS, that is, an RE on which a PTRS associated with the minimum DMRS port number is located is the first RE of a minimum DMRS port, and an RE on which a PTRS associated with the second DMRS port number is located is the second RE of the second DMRS port, as shown in FIG. 5.

Optionally, when two DMRS ports associated with PTRS ports are frequency domain-code division multiplexed (frequency domain code division multiplexing, FD-CDM) or occupy a same frequency domain position but use different sequences such as CSs (cyclic shifts), the foregoing case is also applicable.

Because $f_{22}$ and $f_{21}$ have a similar principle. To avoid repetition, details are not described herein again.

In still another optional embodiment, when the reference information includes the PTRS port number/quantity/frequency domain density, this is similar to a case in which the reference information includes the DMRS port number/quantity/subcarrier index, and a difference lies in that the PTRS frequency domain density is usually combined with other information for use. The frequency offset determined based on the ID of the terminal device may be greater than the frequency domain interval of the PTRS. In this case, the offset is meaningless. Therefore, the offset needs to be mapped to the frequency domain interval of the PTRS. In an implementation, a modulo operation may be performed on the frequency domain interval M of the PTRS by the PTRS frequency domain density, to obtain an updated offset of the frequency domain position of the PTRS, that is, f_offset new=mod (f_offset, M).

In still another optional embodiment, the reference information may include the codeword number/quantity. When the codeword quantity is 2 and PTRS ports between codewords are non-orthogonally multiplexed, different codewords may have different offsets, for example, an offset of the first codeword is 0, and an offset of the second codeword is N.

Optionally, when the reference information includes only one type of information, the transmission parameter may be determined according to the foregoing method. When the reference information includes a plurality of types of information, the plurality of types of information may be simply linearly superimposed, or may be combined for use. This is not limited in this embodiment of this application.

In an optional embodiment, in one RB, a frequency domain position of a PTRS of the terminal device may be determined based on at least one of a DMRS port number associated with the PTRS, the identifier of the terminal device, and a PTRS port number.

For example, a modulo operation may be performed on the PTRS frequency domain density by the offset of the frequency domain position that is determined based on the ID of the terminal device.

For another example, for the offset of the frequency domain position that is determined based on the codeword quantity, a DMRS pattern may be further considered, that is, the offset of the second codeword is an integer multiple of the frequency domain interval of the DMRS.

For another example, when positions of DMRS associated with PTRSs of three terminal devices (a terminal device 1, a terminal device 2, and a terminal device 3) in an RB are all REs/subcarriers with numbers of 0, 4, and 8, different DMRS subcarriers may be allocated based on IDs of the terminals for mapping the PTRSs. For example, a mapped frequency domain position of an $M^{th}$ PTRS of the terminal device 1 may be 0+M*N1, a mapped frequency domain position of an $M^{th}$ PTRS of the terminal device 2 may be 4+M*N2, and a frequency domain position of an Mt h PTRS mapped by the terminal device 3 may be 8+M*N3, where M is an integer greater than or equal to 0, N1 indicates a frequency domain interval of the PTRS of the terminal device 1, N2 indicates a frequency domain interval of the PTRS of the terminal device 2, and N3 indicates a frequency domain interval of the PTRS of the terminal device 3.

Optionally, when frequency domain positions of PTRSs of all of a plurality of terminal devices that are determined based on DMRS ports of the terminal devices and resource elements to which DMRSs are mapped are the same, because a DMRS frequency domain density is greater than the PTRS frequency domain density, the frequency domain position of the PTRS of the terminal device may be further selected from a frequency domain position of the DMRS based on the identifier of the terminal device.

According to the reference signal transmission method provided in this embodiment of this application, the sequence of the PTRS of the terminal device is determined based on the reference information of the terminal device, so that the sequence of the PTRS of the terminal device can be different from a sequence of a PTRS of another terminal device, and randomness of interference to the PTRS of the terminal device is improved by using randomness of the PTRS of the another terminal device, to help randomize the interference to the PTRS of the terminal device, thereby helping stabilize performance of estimating noise by using the PTRS.

In addition, according to the reference signal transmission method provided in this embodiment of this application, because a multi-user multiple-input multiple-output (multi-user multiple-input multiple-output, MU-MIMO) technology supports non-orthogonal multiplexing between PTRS ports and between a PTRS port and data, the frequency domain position of the PTRS of the terminal device is determined based on the reference information of the terminal device, so that PTRSs of paired (paired) terminal devices can be mapped to different frequency domain positions by introducing an RB-level frequency domain offset or a resource element (resource element, RE)—level frequency domain offset. That is, the interference to the PTRS of the terminal device comes from data of the another terminal device, and the randomness of the interference to the PTRS of the terminal device is improved by using randomness of the data of the another terminal device, to help randomize the interference to the PTRS of the terminal device, thereby helping stabilize the performance of estimating noise by using the PTRS.

S320: The terminal device obtains the transmission parameter.

Optionally, in S320, the terminal device may determine the transmission parameter, or the terminal device may receive the transmission parameter sent by the network device. This is not limited in this embodiment of this application.

In an optional embodiment, in S320, the obtaining, by the terminal device, the transmission parameter may be: determining, by the terminal device, the transmission parameter based on the reference information and the preconfigured first mapping relationship.

In another optional embodiment, before S320, the network device may send the transmission parameter to the terminal device; and correspondingly, in S320, the obtaining, by the terminal device, the transmission parameter may be: receiving, by the terminal device, the transmission parameter sent by the network device.

Optionally, the network device may send the transmission parameter to the terminal device by using first signaling; and correspondingly, the terminal device may receive the transmission parameter that is sent by the network device by using the first signaling.

Optionally, the first signaling may be radio resource control (radio resource control, RRC) signaling, media access control (media access control, MAC) control element (control element, CE) signaling, or downlink control information (downlink control information, DCI) signaling. This is not limited in this embodiment of this application.

In still another optional embodiment, before S320, the network device may send the first mapping relationship to the terminal device; and correspondingly, in S320, the obtaining, by the terminal device, the transmission parameter may be: receiving, by the terminal device, the first mapping relationship sent by the network device, and determining, by the terminal device, the transmission parameter based on the reference information and the first mapping relationship.

Optionally, the network device may send the first mapping relationship to the terminal device by using second signaling; and correspondingly, the terminal device may receive the first mapping relationship that is sent by the network device by using the second signaling.

Optionally, the second signaling may be radio resource control (radio resource control, RRC) signaling, media access control (media access control, MAC) control element (control element, CE) signaling, or downlink control information (downlink control information, DCI) signaling. This is not limited in this embodiment of this application.

It should be understood that, when the network device sends the transmission parameter or the first mapping relationship to the terminal device by using the RRC signaling, because a configuration period of the RRC signaling is greater than a changing speed of the reference information such as the PTRS, an offset of a frequency domain position of the PTRS that is configured by using the RRC signaling may exceed the frequency domain interval of the PTRS. How the network device configures the offset of the frequency domain position of the PTRS of the terminal device by using the RRC signaling in two possible scenarios is described below:

(a) For a PTRS in data transmission, the PTRS frequency domain density of the terminal device is determined by a bandwidth scheduled by the network device for the terminal device, and a higher bandwidth indicates a smaller PTRS frequency domain density. The network device may configure, for the terminal device by using the RRC signaling, the offset of the frequency domain position that is determined based on fixed reference information such as the ID of the terminal device and a PTRS port number. When the network device or the terminal device determines, based on the fixed reference information, that the configured offset is greater than a frequency domain interval of the PTRS during data transmission, the configured offset is meaningless. In this case, a modulo operation is performed on the frequency domain interval of the PTRS by the offset configured by the network device or the terminal device, or the configured offset may be normalized based on the frequency domain interval of the PTRS, that is, f_offset new=floor (f_offset*M/(a maximum value of f_offset)), or another operation capable of mapping the configured offset to the frequency domain interval of the PTRS may be used. This is not limited in this embodiment of this application, but the network device and the terminal device need to pre-agree on an operation to be used.

(b) For a PTRS in system information, to ensure reception reliability of a system message, the network device may configure the highest PTRS frequency domain density by default. In this case, the PTRS frequency domain density and the PTRS port are known to the RRC signaling. Therefore, a configuration of the PTRS is already considered when the network device configures the offset of the frequency domain position by using the RRC signaling, that is, the configuration can be directly used to determine the frequency domain position of the PTRS during mapping.

Optionally, the offset of the frequency domain position of the PTRS of the terminal device may include an offset (a first offset) between frequency domain positions of the PTRS of the terminal device and a PTRS of another terminal device, and an offset (a second offset) between frequency domain positions of a plurality of PTRS ports between the terminal device. Similarly, the scrambling value of the sequence of the PTRS of the terminal device may include a scrambling value (a first scrambling value) of the sequence of the PTRS of the terminal device, and a scrambling value (a second scrambling value) of sequences of a plurality of different PTRS ports of the terminal device.

Optionally, the first offset (the first scrambling value) may be determined based on the ID of the terminal, and the second offset (the second scrambling value) may be determined based on the scheduling information of the DMRS and/or the ID of the terminal device. This is not limited in this embodiment of this application.

S330: The network device sends the PTRS to the terminal device based on the transmission parameter; and correspondingly, the terminal device receives, based on the transmission parameter, the PTRS sent by the network device.

Optionally, in S330, the sending, by the network device, the PTRS to the terminal device based on the transmission parameter may be: determining, by the network device based on an index of a subcarrier/an RE corresponding to the frequency domain position of the PTRS, an index that corresponds to the index of the subcarrier/RE and that is of a physical resource block (physical resource block, PRB) in which the subcarrier/RE is located; and selecting, by the network device, from the sequence of the PTRS based on the index of the PRB, a symbol corresponding to the index of the PRB, and mapping the symbol to the subcarrier/RE corresponding to the frequency domain position.

Correspondingly, the receiving, by the terminal device based on the transmission parameter, the PTRS sent by the network device may be: determining, by the terminal device based on the index of the subcarrier/RE corresponding to the frequency domain position of the PTRS, the index that corresponds to the index of the subcarrier/RE and that is of the PRB in which the subcarrier/RE is located; and obtaining, by the terminal device from the subcarrier/RE in the PRB, the symbol corresponding to the index of the PRB, and estimating phase noise based on the obtained symbol and the sequence of the PTRS.

It should be understood that, when the network device allocates N VRBs to the terminal device, in ascending order of indexes of the N VRBs, the N VRBs sequentially correspond to N consecutive relative RBs, and indexes of the N relative RBs are 0, 1, . . . , and N−1, where N is an integer greater than 0. For example, four VRBs with indexes of 0, 1, 6, and 7 are allocated by the network device to the terminal device, and in ascending order of the indexes, the four VRBs correspond to four relative RBs with indexes of 0, 1, 2, and 3.

It should be further understood that, in this embodiment of this application, the frequency domain position of the PTRS may be understood as a frequency domain position of the PTRS in the N relative RBs.

Optionally, the network device or the terminal device can determine, based on a correspondence between a relative RB and a VRB and a preset correspondence between a VRB and a PRB, an index of a physical subcarrier/an RE corresponding to the frequency domain position of the PTRS, and an index that corresponds to the index of the physical subcarrier/RE and that is of a PRB in which the physical subcarrier/RE is located.

It should be further understood that, the network device and the terminal device may estimate the phase noise based on the PTRS, or may estimate the phase noise based on a PCRS. The PTRS and the PCRS are collectively referred to as a PTRS in this embodiment of this application, but this is not limited in this embodiment of this application.

Figure 6:
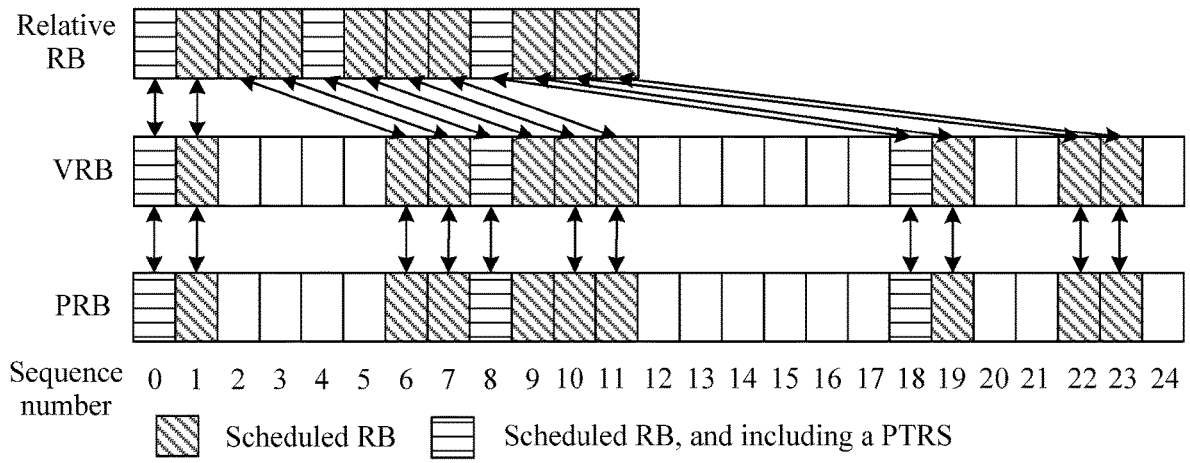
FIG. 6 is a schematic diagram of a frequency domain position of a PTRS according to an embodiment of this application.

FIG. 6 is a schematic diagram of PTRS mapping according to an embodiment of this application. In FIG. 6, it is assumed that a length of the sequence of the PTRS of the terminal device is 24, and the network device schedules a total of 12 nonconsecutive virtual resource blocks (virtual resource block, VRB) with indexes of 0, 1, 6, 7, 8, 9, 10, 11, 18, 19, 22, and 23 for the terminal device, for transmitting the PTRS.

It should be understood that, because the 12 VRBs scheduled by the network device are nonconsecutive, and the PTRS frequency domain density is ¼, that is, one symbol is mapped to every four RBs, the network device needs to determine a specific RB to which a symbol is to be mapped.

Optionally, it is assumed that there are 12 consecutive relative RBs, and in ascending order of indexes of VRBs, the 12 nonconsecutive VRBs sequentially correspond to the 12 relative RBs. For example, a VRB with an index of 0 corresponds to a relative RB with an index of 0, a VRB with an index of 1 corresponds to a relative RB with an index of 1, a VRB with an index of 6 corresponds to a relative RB with an index of 2, a VRB with an index of 7 corresponds to a relative RB with an index of 3, . . . , and a VRB with an index of 23 corresponds to a relative RB with an index of 11.

When the PTRS frequency domain density that is configured by the network device for the terminal device is ¼, and each RB includes 12 subcarriers, the network device determines, based on the offset of the frequency domain position of the PTRS of the terminal device that is 10 subcarriers, that relative RBs corresponding to the frequency domain position of the PTRS include: a subcarrier/an RE with an index of 10 (namely, the eleventh subcarrier of the relative RB with the index of 0), a subcarrier/an RE with an index of 58 (namely, 10+48) (namely, the eleventh subcarrier of the relative RB with the index of 4), and a subcarrier/an RE with an index of 106 (namely, 10+48*2) (namely, the eleventh subcarrier of the relative RB with the index of 8).

The network device may determine, based on a correspondence between a relative RB and a VRB, that VRBs corresponding to the frequency domain position of the PTRS include: the VRB with the index of 0, a VRB with an index of 8, and a VRB with an index of 18. The network device may determine, based on the correspondence between a VRB and a PRB, that PRBs corresponding to the frequency domain position of the PTRS include: a PRB with an index of 0, a PRB with an index of 8, and a PRB with an index of 18.

Therefore, the network device may map a symbol in the sequence of the PTRS that corresponds to the PRB with the index of 0 to the PRB with the index of 0, map a symbol corresponding to the PRB with the index of 8 to the PRB with the index of 8, and map a symbol corresponding to the PRB with the index of 18 to the PRB with the index of 18.

In an optional embodiment, the network device schedules, for the terminal device, 12 PRBs for transmitting the PTRS, and the PTRS frequency domain density is ¼, that is, one symbol is mapped to every four PRBs, so that a symbol with an index of 0 in the sequence of the PTRS corresponds to PRBs with indexes of 0 to 3, a symbol with an index of 1 corresponds to PRBs with indexes of 4 to 7, a symbol with an index of 2 corresponds to PRBs with indexes of 8 to 11, and a correspondence between another symbol and PRBs can be obtained by using the same principle.

Therefore, a symbol corresponding to the PRB with an index of 0 is the symbol with the index of 0 in the sequence of the PTRS, a symbol corresponding to the PRB with an index of 8 is the symbol with the index of 2, and a symbol corresponding to a PRB with an index of 18 can be obtained by using the same principle.

Optionally, in this embodiment of this application, only the correspondence between a PRB and a VRB in FIG. 6 is used as an example for description, but there may be another correspondence between a PRB and a VRB. This is not limited in this embodiment of this application.

Figure 7:
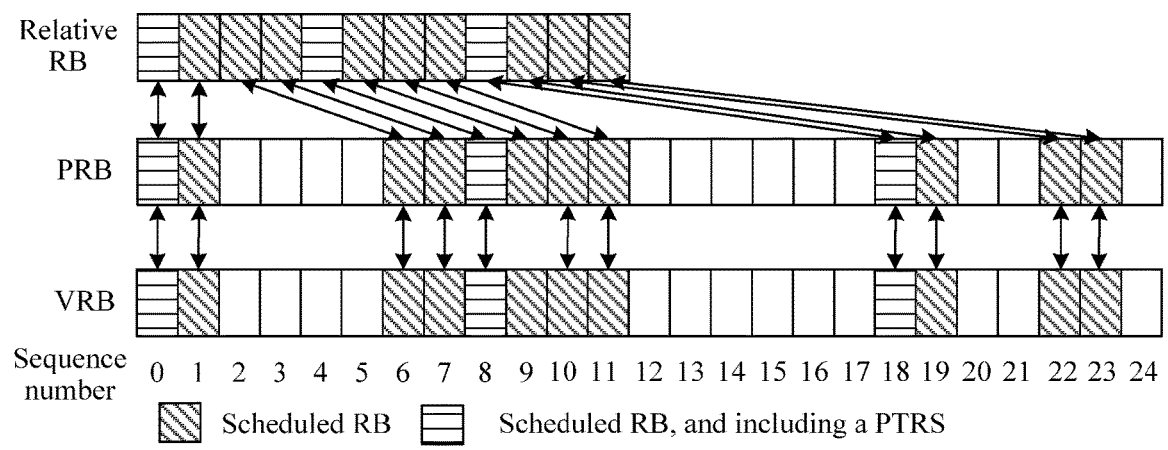
FIG. 7 is another schematic diagram of a frequency domain position of a PTRS according to an embodiment of this application.

FIG. 7 is a schematic diagram of PTRS mapping according to an embodiment of this application. In FIG. 7, it is assumed that a length of the sequence of the PTRS of the terminal device is 24, and the network device schedules a total of 12 nonconsecutive VRBs with indexes of 0, 1, 6, 7, 8, 9, 10, 11, 18, 19, 22, and 23 for the terminal device, for transmitting the PTRS. Based on a correspondence between a VRB and a PRB shown in FIG. 7, a total of 12 nonconsecutive PRBs with indexes of 0, 1, 6, 7, 8, 9, 10, 11, 18, 19, 22, and 23 corresponding to the 12 VRBs may be obtained.

It should be understood that, because the 12 PRBs scheduled by the network device are nonconsecutive, and the PTRS frequency domain density is ¼, that is, one symbol is mapped to every four RBs, the network device needs to determine a specific RB to which a symbol is to be mapped.

Optionally, it is assumed that there are 12 consecutive relative RBs, and in ascending order of indexes of PRBs, the 12 nonconsecutive PRBs sequentially correspond to the 12 relative RBs. For example, a PRB with an index of 0 corresponds to a relative RB with an index of 0, a PRB with an index of 1 corresponds to a relative RB with an index of 1, a PRB with an index of 6 corresponds to a relative RB with an index of 2, with an index of 7 corresponds to a relative RB with an index of 3, . . . , and a PRB with an index of 23 corresponds to a relative RB with an index of 11.

When the PTRS frequency domain density that is configured by the network device for the terminal device is ¼, and each RB includes 12 subcarriers, the network device determines, based on the offset of the frequency domain position of the PTRS of the terminal device that is 10 subcarriers, that relative RBs corresponding to the frequency domain position of the PTRS include: a subcarrier/an RE with an index of 10 (namely, the eleventh subcarrier of the relative RB with the index of 0), a subcarrier/an RE with an index of 58 (namely, 10+48) (namely, the eleventh subcarrier of the relative RB with the index of 4), and a subcarrier/an RE with an index of 106 (namely, 10+48*2) (namely, the eleventh subcarrier of the relative RB with the index of 8).

The network device may determine, based on a correspondence between a relative RB and a PRB, that PRBs corresponding to the frequency domain position of the PTRS include: the PRB with an index of 0, the PRB with an index of 8, and the PRB with an index of 18.

Therefore, the network device may map a symbol in the sequence of the PTRS that corresponds to the PRB with the index of 0 to the PRB with the index of 0, map a symbol corresponding to the PRB with the index of 8 to the PRB with the index of 8, and map a symbol corresponding to the PRB with the index of 18 to the PRB with the index of 18.

Figure 8:
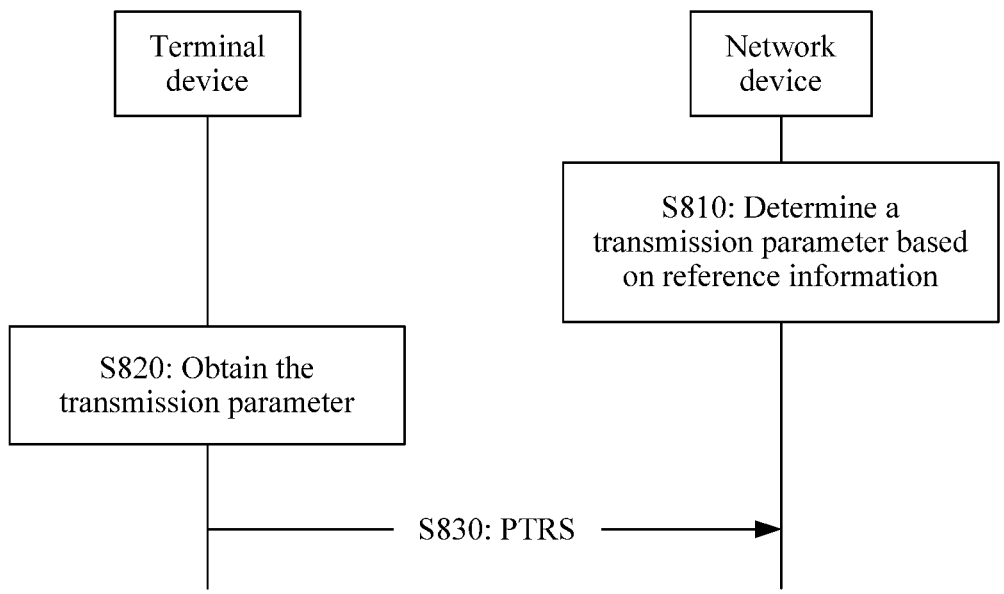
FIG. 8 is a schematic flowchart of another reference signal transmission method according to an embodiment of this application.

FIG. 8 is a schematic flowchart of a reference signal transmission method 800 according to an embodiment of this application. The transmission method 800 may be applied to the communications system 100 shown in FIG. 1, for example, may be applied to an uplink transmission scenario of a reference signal.

S810: A network device determines a transmission parameter of a PTRS of a terminal device based on reference information of the terminal device, where the reference information includes at least one of an identifier of the terminal device and scheduling information of the terminal device, and the transmission parameter includes at least one of a sequence of the PTRS and a frequency domain position of the PTRS.

S820: The terminal device obtains the transmission parameter.

S830: The terminal device sends the PTRS to the network device based on the transmission parameter; and correspondingly, the network device receives, based on the transmission parameter, the PTRS sent by the terminal device.

It should be understood that, S810 in FIG. 8 is similar to S310 in FIG. 3, and therefore, for S810, refer to the implementation in S310 for implementation; and S820 in FIG. 8 is similar to S320 in FIG. 3, and therefore, for S820, refer to the implementation in S320 for implementation. To avoid repetition, details are not described herein again.

Optionally, in S830, the sending, by the terminal device, the PTRS to the network device based on the transmission parameter may be: determining, by the terminal device based on an index of a subcarrier/an RE corresponding to the frequency domain position of the PTRS, an index that corresponds to the index of the subcarrier/RE and that is of a PRB in which the subcarrier/RE is located; and selecting, by the terminal device, from the sequence of the PTRS based on the index of the PRB, a symbol corresponding to the index of the PRB, and mapping the symbol to the subcarrier/RE corresponding to the frequency domain position.

Correspondingly, the receiving, by the network device based on the transmission parameter, the PTRS sent by the terminal device may be: determining, by the network device based on the index of the subcarrier/RE corresponding to the frequency domain position of the PTRS, the index that corresponds to the index of the subcarrier/RE and that is of the PRB in which the subcarrier/RE is located; and obtaining, by the network device from the subcarrier/RE in the PRB, the symbol corresponding to the index of the PRB, and estimating phase noise based on the obtained symbol and the sequence of the PTRS.

It should be understood that, S830 in FIG. 8 is similar to S330 in FIG. 3, and therefore, for S830, refer to the implementation in S330 for implementation. To avoid repetition, details are not described herein again.

The reference signal transmission method provided in the embodiments of this application is described in detail above with reference to FIG. 2 to FIG. 8, and a reference signal transmission apparatus provided in an embodiment of this application is described below with reference to FIG. 9 to FIG. 12.

Figure 9:
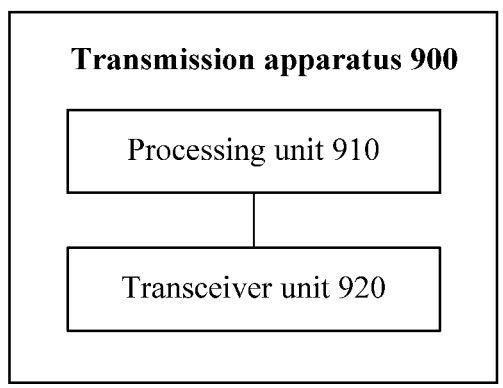
FIG. 9 is a schematic block diagram of a reference signal transmission apparatus according to an embodiment of this application.

FIG. 9 shows a reference signal transmission apparatus 900 according to an embodiment of this application. The transmission apparatus 900 includes:

a processing unit 910, configured to determine a transmission parameter of a phase tracking reference signal (PTRS) of a terminal device based on reference information of the terminal device, where the reference information includes at least one of an identifier of the terminal device and scheduling information of the terminal device, and the transmission parameter includes at least one of a sequence of the PTRS and a frequency domain position of the PTRS; and a transceiver unit 920, configured to transmit the PTRS with the terminal device based on the transmission parameter obtained by the processing unit 910.

Optionally, when the transmission parameter includes the sequence of the PTRS, the processing unit is configured to: determine a scrambling value of the sequence of the PTRS based on the reference information; and determine the sequence of the PTRS based on the scrambling value.

Optionally, when the transmission parameter includes the frequency domain position of the PTRS, the processing unit is configured to: determine an offset of the frequency domain position of the PTRS based on the reference information; and determine the frequency domain position of the PTRS based on the offset.

Optionally, the processing unit is configured to determine the transmission parameter based on the reference information and a first mapping relationship, where the first mapping relationship includes a correspondence between the reference information and the transmission parameter.

Optionally, the transceiver unit is further configured to: before sending the PTRS to the terminal device based on the transmission parameter, send the first mapping relationship to the terminal device.

Optionally, the transceiver unit is further configured to: before transmitting the PTRS with the terminal device based on the transmission parameter, send the transmission parameter to the terminal device.

Optionally, when the transmission parameter includes the frequency domain position of the PTRS, the offset of the frequency domain position of the PTRS is less than a frequency domain interval of the PTRS.

Optionally, the scheduling information of the terminal device includes at least one of the following information: scheduling information of a demodulation reference signal (DMRS), scheduling information of the PTRS, scheduling information of a sounding reference signal (SRS), and scheduling information of a codeword.

It should be understood that, the transmission apparatus 900 herein is reflected in a form of a functional unit. The term "unit" herein may refer to an application-specific integrated circuit (application-specific integrated circuit, ASIC), an electronic circuit, a processor (for example, a shared processor, a dedicated processor, or a group processor) configured to execute one or more software or firmware programs, a memory, a merge logic circuit, and/or other suitable components that support the described function. In an optional example, a person skilled in the art may understand that, the transmission apparatus 900 may be the network device in the embodiments of the foregoing transmission method 300 and transmission method 800, and the transmission apparatus 900 may be configured to perform the procedures and/or steps corresponding to the network device in the embodiments of the foregoing method 300 and method 800. To avoid repetition, details are not described herein again.

Figure 10:
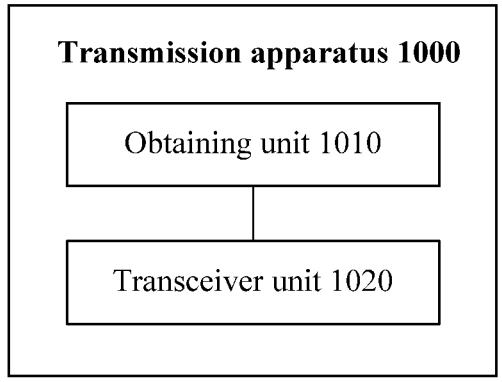
FIG. 10 is a schematic block diagram of another reference signal transmission apparatus according to an embodiment of this application.

FIG. 10 shows a reference signal transmission apparatus 1000 according to an embodiment of this application. The transmission apparatus 1000 includes:

an obtaining unit 1010, configured to obtain a transmission parameter of a phase tracking reference signal (PTRS), where the transmission parameter is determined based on reference information of the transmission apparatus, the transmission parameter includes at least one of a sequence of the PTRS and a frequency domain position of the PTRS, and the reference information includes at least one of an identifier of the transmission apparatus and scheduling information of the transmission apparatus; and a transceiver unit 1020, configured to transmit the PTRS with a network device based on the transmission parameter obtained by the obtaining unit 1010.

Optionally, the obtaining unit is configured to determine the transmission parameter based on the reference information.

Optionally, when the transmission parameter includes the sequence of the PTRS, the obtaining unit is configured to: determine a scrambling value of the sequence of the PTRS based on the reference information; and determine the sequence of the PTRS based on the scrambling value.

Optionally, when the transmission parameter includes the frequency domain position of the PTRS, the obtaining unit is configured to: determine an offset of the frequency domain position of the PTRS based on the reference information; and determine the frequency domain position of the PTRS based on the offset.

Optionally, the obtaining unit is configured to determine the transmission parameter based on the reference information and a first mapping relationship, where the first mapping relationship includes a correspondence between the reference information and the transmission parameter.

Optionally, the transceiver unit is further configured to: before the transmission parameter is determined based on the reference information and the first mapping relationship, receive the first mapping relationship sent by the network device.

Optionally, the obtaining unit is further configured to receive the transmission parameter sent by the network device.

Optionally, when the transmission parameter includes the frequency domain position of the PTRS, the offset of the frequency domain position of the PTRS is less than a frequency domain interval of the PTRS.

Optionally, the scheduling information of the transmission apparatus includes at least one of the following information: scheduling information of a demodulation reference signal (DMRS), scheduling information of the PTRS, scheduling information of a sounding reference signal SRS, and scheduling information of a codeword.

It should be understood that, the transmission apparatus 1000 herein is reflected in a form of a functional unit. The term "unit" herein may refer to an application-specific integrated circuit (application specific integrated circuit, ASIC), an electronic circuit, a processor (for example, a shared processor, a dedicated processor, or a group processor) configured to execute one or more software or firmware programs, a memory, a merge logic circuit, and/or other suitable components that support the described function. In an optional example, a person skilled in the art may understand that, the transmission apparatus 1000 may be the terminal device in the embodiments of the foregoing transmission method 300 and transmission method 800, and the transmission apparatus 1000 may be configured to perform the procedures and/or steps corresponding to the terminal device in the embodiments of the foregoing transmission method 300 and transmission method 800. To avoid repetition, details are not described herein again.

Figure 11:
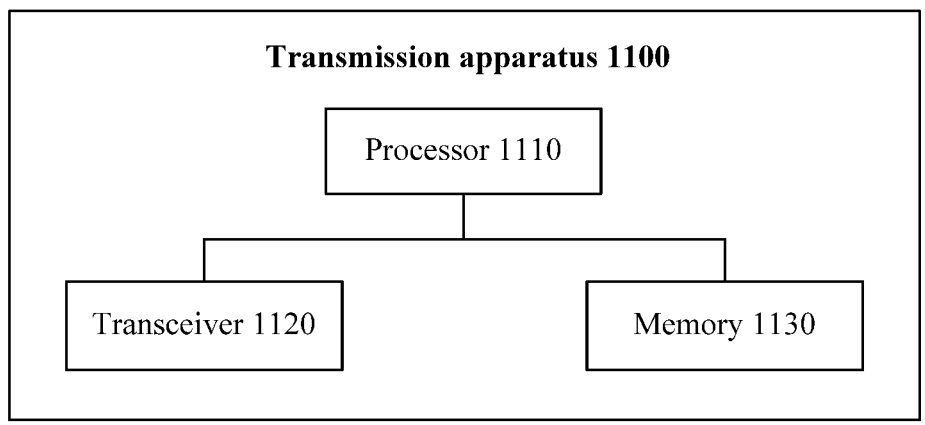
FIG. 11 is a schematic block diagram of still another reference signal transmission apparatus according to an embodiment of this application.

FIG. 11 shows a reference signal transmission apparatus 1100 according to an embodiment of this application. The transmission apparatus 1100 may be the network device in the communications system shown in FIG. 1, and the network device may use a hardware architecture shown in FIG. 11. The network device may include a processor 1110, a transceiver 1120, and a memory 1130. The processor 1110, the transceiver 1120, and the memory 1130 communicate with one another by using an internal connection path. A related function implemented by the processing unit 910 in FIG. 9 may be implemented by the processor 1110, and a related function implemented by the transceiver unit 920 may be implemented by the transceiver 1120.

The processor 1110 may include one or more processors, for example, include one or more central processing units (central processing unit, CPU). When the processor is one CPU, the CPU may be a single-core CPU or a multi-core CPU.

The transceiver 1120 is configured to send data and/or a signal, and receive data and/or a signal. The transceiver may include a transmitter and a receiver. The transmitter is configured to send data and/or a signal, and the receiver is configured to receive data and/or a signal.

The memory 1130 includes but is not limited to a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). The memory 1130 is configured to store a related instruction and data.

The memory 1130 is configured to store program code and data of the network device, and may be a separate device or integrated into the processor 1110.

Specifically, the processor 1110 is configured to control the transceiver to transmit a reference signal with a terminal device, for example, perform S330. For details, refer to the descriptions in the method embodiments, and details are not described herein again.

It may be understood that, FIG. 11 merely shows a simplified design of the network device. In actual application, the network device may also include other necessary components, including but not limited to any quantity of transceivers, processors, controllers, memories, and the like, and all network devices that can implement this application shall all fall within the protection scope of this application.

In a possible design, the transmission apparatus 1100 may be a chip, for example, may be a communications chip available for the network device, and configured to implement a related function of the processor 1110 in the network device. The chip may be a field programmable gate array for implementing related functions, a dedicated integrated chip, a system chip, a central processing unit, a network processor, a digital signal processing circuit, a microcontroller, and a programmable controller or another integrated chip. The chip may optionally include one or more memories, configured to store program code, and when the code is executed, the processor implements a corresponding function.

Figure 12:
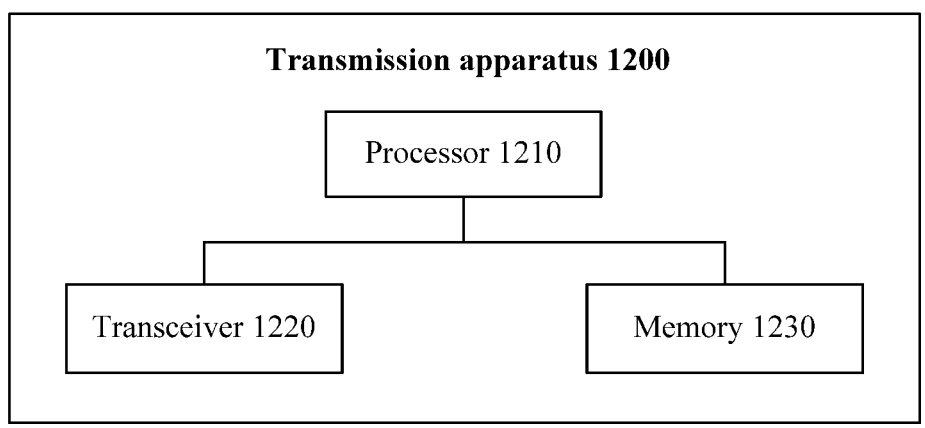
FIG. 12 is a schematic block diagram of still another reference signal transmission apparatus according to an embodiment of this application.

FIG. 12 shows a reference signal transmission apparatus 1200 according to an embodiment of this application. The transmission apparatus 1200 may be the terminal device in the communications system shown in FIG. 1, and the terminal device may use a hardware architecture shown in FIG. 12. The terminal device may include a processor 1210, a transceiver 1220, and a memory 1230. The processor 1210, the transceiver 1220, and the memory 1230 communicate with one another by using an internal connection path. A related function implemented by the processing unit 1010 in FIG. 10 may be implemented by the processor 1210, and a related function implemented by the transceiver unit 1020 may be implemented by the transceiver 1220.

The processor 1210 may include one or more processors, for example, include one or more central processing units CPUs. When the processor is one CPU, the CPU may be a single-core CPU or a multi-core CPU.

The transceiver 1220 is configured to send data and/or a signal, and receive data and/or a signal. The transceiver may include a transmitter and a receiver. The transmitter is configured to send data and/or a signal, and the receiver is configured to receive data and/or a signal.

The memory 1230 includes but is not limited to a RAM, a ROM, an EPROM, or a CD-ROM. The memory 1230 is configured to store a related instruction and data.

The memory 1230 is configured to store program code and data of the terminal device, and may be a separate device or integrated into the processor 1210.

Specifically, the processor 1210 is configured to control the transceiver to transmit a reference signal with a network device, for example, perform S330. For details, refer to the descriptions in the method embodiments, and details are not described herein again.

It may be understood that, FIG. 12 merely shows a simplified design of the terminal device. In actual application, the terminal device may also include other necessary components, including but not limited to any quantity of transceivers, processors, controllers, memories, and the like, and all terminal devices that can implement this application shall fall within the protection scope of this application.

In a possible design, the transmission apparatus 1200 may be a chip, for example, may be a communications chip available for the terminal device, configured to implement a related function of the processor 1210 in the terminal device. The chip may be a field programmable gate array for implementing related functions, a dedicated integrated chip, a system chip, a central processing unit, a network processor, a digital signal processing circuit, a microcontroller, and a programmable controller or another integrated chip. The chip may optionally include one or more memories, configured to store program code, and when the code is executed, the processor is enabled to implement a corresponding function.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on a computer, the procedure or functions according to the embodiments of the present disclosure are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instruction may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc, DVD), a semiconductor medium (for example, a solid-state drive (solid-state drive, SSD)), or the like.

A person of ordinary skill in the art may understand that all or some of the processes of the methods in the embodiments may be implemented by a computer program instructing relevant hardware. The program may be stored in a computer-readable storage medium. When the program is executed, the processes of the methods in the embodiments may be performed. The foregoing storage medium includes: any medium that can store program code, such as a ROM, a RAM, a magnetic disk, or an optical disc.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining an offset of a frequency domain position of a phase tracking reference signal (PTRS), wherein the offset of the frequency domain position of the PTRS comprises a resource element (RE) offset and a resource block (RB) offset;
   determining the frequency domain position of the PTRS based on a function of the RE offset, the RB offset and a quantity of subcarriers per RB, wherein the RE offset is determined based on a demodulation reference signal (DMRS) port number, and the RB offset is determined based on an identifier of a terminal device, wherein the function of the RE offset, the RB offset and the quantity of subcarriers per RB comprises an addition of the RE offset and a function of the RB offset and the quantity of subcarriers per RB.

2. The method of claim 1, wherein the determining the offset of the frequency domain position of the PTRS comprises:
   determining the RE offset of the frequency domain position of the PTRS based on the DMRS port number and a first mapping relationship, wherein the first mapping relationship comprises a correspondence between the DMRS port number and the RE offset of the frequency domain position of the PTRS.

3. The method of claim 2, wherein the first mapping relationship is configured by a network device for the terminal device.

4. The method of claim 1, wherein the RE offset is further based on scheduling information of a DMRS, wherein the DMRS is associated with the PTRS, the scheduling information of the DMRS includes the DMRS port number, and the scheduling information of the DMRS further comprises one or more of the following information:
   a DMRS port pattern, resource element mapping, a subcarrier index to which the DMRS is mapped, or a resource element to which the DMRS is mapped.

5. The method of claim 1, wherein the determining the offset of the frequency domain position of the PTRS comprises:
   determining the RB offset of the frequency domain position of the PTRS based on the identifier of the terminal device and a second mapping relationship, wherein the second mapping relationship comprises a correspondence between the identifier of the terminal device and the RB offset of the frequency domain position of the PTRS.

6. The method of claim 1, wherein the method is performed by the terminal device or a network device.

7. An apparatus, comprising:
   at least one processor communicably coupled to one or more memories storing programming instructions for execution by the at least one processor to perform operations comprising:
   determining an offset of a frequency domain position of a phase tracking reference signal (PTRS), wherein the offset of the frequency domain position of the PTRS comprises a resource element (RE) offset and a resource block (RB) offset;
   determining the frequency domain position of the PTRS based on a function of the RE offset, the RB offset and a quantity of subcarriers per RB, wherein the RE offset is determined based on a demodulation reference signal (DMRS) port number, and the RB offset is determined based on an identifier of a terminal device, wherein the function of the RE offset, the RB offset and the quantity of subcarriers per RB comprises an addition of the RE offset and a function of the RB offset and the quantity of subcarriers per RB.

8. The apparatus of claim 7, the operations further comprising:
   determining the RE offset of the frequency domain position of the PTRS based on the DMRS port number and a first mapping relationship, wherein the first mapping relationship comprises a correspondence between the DMRS port number and the RE offset of the frequency domain position of the PTRS.

9. The apparatus of claim 8, wherein:
   the first mapping relationship is configured by a network device for the terminal device.

10. The apparatus of claim 7, wherein the RE offset is further based on scheduling information of a DMRS, wherein the DMRS is associated with the PTRS, the scheduling information of the DMRS includes the DMRS port number, and the scheduling information of the DMRS further comprises one or more of the following information:
    a DMRS port pattern, resource element mapping, a subcarrier index to which the DMRS is mapped, or a resource element to which the DMRS is mapped.

11. The apparatus of claim 7, the operations further comprising:
    determining the RB offset of the frequency domain position of the PTRS based on the identifier of the terminal device and a second mapping relationship, wherein the second mapping relationship comprises a correspondence between the identifier of the terminal device and the RB offset of the frequency domain position of the PTRS.

12. The apparatus of claim 7, wherein the apparatus is the terminal device or a network device.

13. A non-transitory computer-readable storage medium, wherein the computer-readable storage medium stores a computer program, and when the computer program is run on a processor, the processor is enabled to perform the method:
    determining an offset of a frequency domain position of a phase tracking reference signal (PTRS), wherein the offset of the frequency domain position of the PTRS comprises a resource element (RE) offset and a resource block (RB) offset;
    determining the frequency domain position of the PTRS based on a function of the RE offset, the RB offset and a quantity of subcarriers per RB, wherein the RE offset is determined based on a demodulation reference signal (DMRS) port number, and the RB offset is determined based on an identifier of a terminal device, wherein the function of the RE offset, the RB offset and the quantity of subcarriers per RB comprises an addition of the RE offset and a function of the RB offset and the quantity of subcarriers per RB.

14. The non-transitory computer-readable storage medium of claim 13, wherein the determining the offset of the frequency domain position of the PTRS comprises:
    determining the RE offset of the frequency domain position of the PTRS based on the DMRS port number and a first mapping relationship, wherein the first mapping relationship comprises a correspondence between the DMRS port number and the RE offset of the frequency domain position of the PTRS.

15. The non-transitory computer-readable storage medium of claim 14, wherein the first mapping relationship is configured by a network device for the terminal device.

16. The non-transitory computer-readable storage medium of claim 13, wherein the RE offset is further based on scheduling information of a DMRS, wherein the DMRS is associated with the PTRS, the scheduling information of the DMRS includes the DMRS port number, and the scheduling information of the DMRS further comprises one or more of the following information:
  a DMRS port pattern, resource element mapping, a subcarrier index to which the DMRS is mapped, or a resource element to which the DMRS is mapped.

17. The non-transitory computer-readable storage medium of claim 13, wherein the determining the offset of the frequency domain position of the PTRS comprises:
  determining the RB offset of the frequency domain position of the PTRS based on the identifier of the terminal device and a second mapping relationship, wherein the second mapping relationship comprises a correspondence between the identifier of the terminal device and the RB offset of the frequency domain position of the PTRS.

\* \* \* \* \*